(No Model.) 2 Sheets—Sheet 1.

H. GUTHRIE.
DRIVING CHAIN GEAR.

No. 464,154. Patented Dec. 1, 1891.

Witnesses
E. B. Bolton
M. A. C. Walsh

Inventor:
Herbert Guthrie

By Richards
his Attorneys (No Model.) 2 Sheets—Sheet 2.

H. GUTHRIE.
DRIVING CHAIN GEAR.

No. 464,154. Patented Dec. 1, 1891.

Witnesses:
E. B. Bolton
W. A. C. Walsh

Inventor:
Herbert Guthrie
By Richards Co.
his Attorneys.

UNITED STATES PATENT OFFICE.

HERBERT GUTHRIE, OF LEVENSHULME, NEAR MANCHESTER, ENGLAND.

DRIVING-CHAIN GEAR.

SPECIFICATION forming part of Letters Patent No. 464,154, dated December 1, 1891.

Application filed August 21, 1891. Serial No. 403,320. (No model.) Patented in England May 15, 1891, No. 8,329.

*To all whom it may concern:*

Be it known that I, HERBERT GUTHRIE, a subject of the Queen of Great Britain, and a resident of Levenshulme, near Manchester, in the county of Lancaster, England, have invented certain new and useful Improvements in Driving-Chain Gear, (for which I have obtained Letters Patent in Great Britain, No. 8,329, bearing date May 15, 1891,) of which the following is a specification.

This invention mainly consists of improvements to that kind of wheels commonly used in velocipedes and bucket-elevators, and is especially applicable to chains and wheels gearing together with large flat link head and tooth surfaces at such an angle with the pitch-line as will cause the chain to rise on the tooth and automatically adjust itself to the pitch-line of the wheel.

Figure 1:
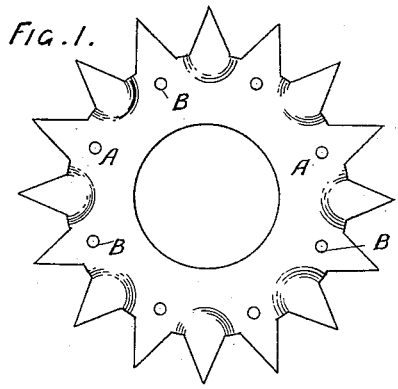
Figure 2:
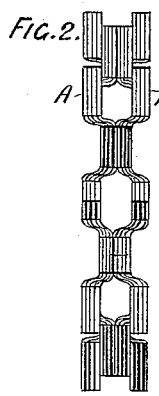
Figure 3:
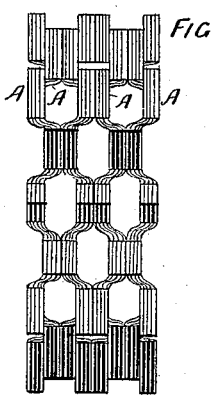
Figure 4:
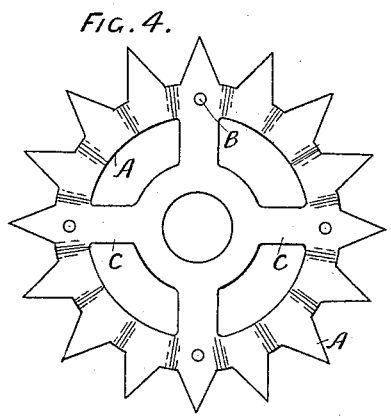
Figure 5:
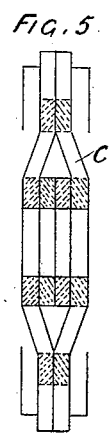
Figure 6:
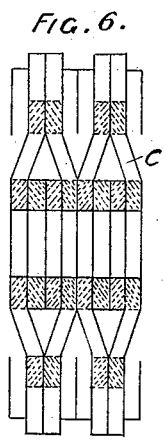
Figure 7:
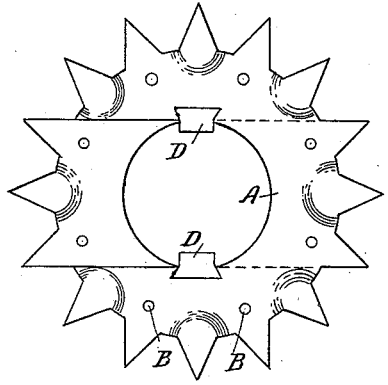
Figure 8:
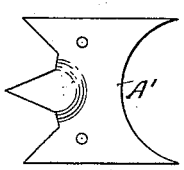
Figure 9:
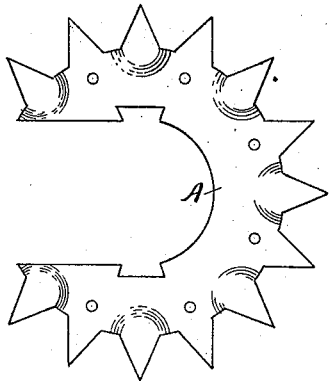
Figure 10:
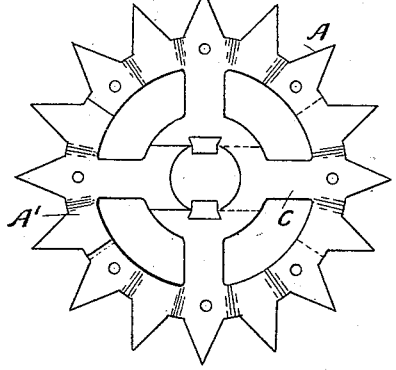
Figure 11:
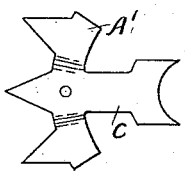
Figure 12:
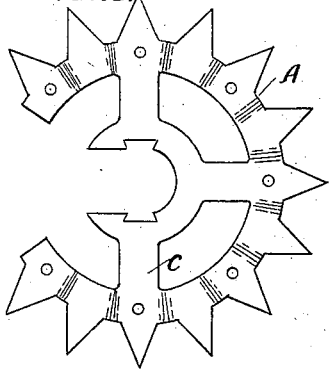
Figure 13:
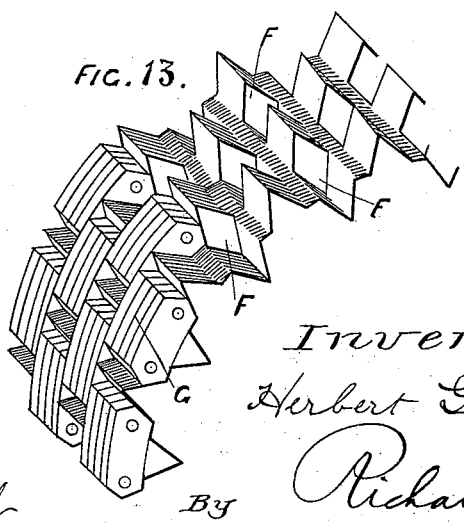

Figure 1 shows a zigzag-tooth ring A, which in Fig. 2 is shown securely fastened by pins or rivets B to a fellow ring A, which arrangement may be multiplied to any extent by adding more rings in the same order. Fig. 3 shows four such rings secured together. Figs. 4, 5, and 6 are corresponding views to 1, 2, and 3, and show a slightly-modified form of wheel having spokes C dished. (See Figs. 5 and 6.) Figs. 7, 8, and 9 show a split wheel, the smaller portion A' of the division being shown detached in Fig. 8. Such a wheel may be joined up to its corresponding plate or plates by the pins B, by the said pins and keys D, with or without dovetail, or alone. Figs. 10, 11, and 12 show another mode of splitting, which is more suitable to the form of wheel with spokes C. Fig. 13 shows a driving-wheel made drum-shaped with the teeth raised from the flat between the slits F, and G is a portion of the link belting in gear with the light wheel.

In wheels I make them with teeth to gear with every link of the chain in contradistinction to every alternate link, as is commonly done. These wheels are laminated—that is to say, composed of separate plates or layers, each plate having twice the number of teeth usual for a given pitch of chain, but of so much longer pitch as allows for loss in bending or setting every alternate tooth out of line with its neighbor, so that the intermediate teeth gear with the intermediate links of the chain. My wheel-rims are therefore composed of only half the number of pieces otherwise necessary for the full number of teeth. Much labor in manufacture is consequently saved, as well as much weight. The offset or zigzag-tooth rings may be set to the extent of one or more thicknesses, as may be required, and fastened together in any number of pairs, sets, or series. Small wheels so made may consist of rims only. Larger wheels may consist of one or more disks similarly zigzagged at the rims, or partly of disks and partly of rims fastened thereto. The said disks may be perforated to form arms of any desired shape, and where two or more disks are used they may be dished so as to form a very stiff and light wheel, similar to wire-spoked cycle-wheels; and, further, even large wheel-rims may be made complete entirely of rings, and these complete rims may be afterward secured to disk or spoke centers. The spaces formed by the zigzagging may be utilized for housing the spoke ends, which is a further great advantage both in cost of manufacture and strength of attachment.

In the matter of split wheels a further advantage of constructing wheels mainly as hereinbefore described is their adaptability to what is commonly known as "splitting." This is done by severing the rings as well as the spoked or disk centers in such a way that the several plates or laminæ of both rim and center or boss overlap or interlace each other, so that a few bolts, pins, or rivets secure the whole together, clipping the shaft or spindle; but in some cases even these bolts, pins, or rivets may be dispensed with. In such case the rim, the disks, or the boss parts, as the case may be, are made to pass each other from opposite directions, clipping the shaft or spindle, as between two forks, with the prongs overlapping each other. Thus when such parts are brought together, say, horizontally, keyways are cut at top and bottom both in the shaft or spindle and in the wheel, so that when the keys are inserted the forks are effectually locked together, holding the wheel intact as well as preventing its turning on the shaft. These keys may be dovetailed into the boss, in which case they will hold the two halves of the wheel together, even though not on the shaft. Bosses of such wheels may be made either entirely of punchings or part punchings and part castings or forgings, or entirely of castings or forgings, as the case may be. I sometimes form the wheels of thin sheet metal bent round drum shape, like an ordinary strap-pulley, except that the said sheet has teeth formed out of it in the following manner: A series of sheared slits are formed in regular lines both crosswise and circumferentially, the distance of the said slits from each other crosswise being equal to the width of the links or groups of links and the distance lengthwise when finished equal to the pitch from pin to pin of the chain. Between the crosswise lines of slits there are crosswise lines of plain metal, which firmly hold the slit portions together. At the same time that these slits are formed every alternate space or strip between them is depressed or raised to form the teeth, and in the next following row of slits the alternate strips or spaces are depressed or raised so as to form its row of teeth alternating with those both before and behind, forming a similar arrangement to that already described as being made up of a number of separate rings. Plate-rims slit and pressed out into teeth, as above described, I simply join together by lapping and riveting the plain portions, while the spoke portions may be formed similarly to those already hereinbefore described or any other convenient form.

Having now particularly described and ascertained the nature of my said invention and in what manner the same is to be performed, I declare that what I claim, and desire to secure by Letters Patent of the United States, is—

A chain gear-wheel composed of two or more plates or laminæ, having an extra number of teeth, said teeth being set off into a zigzag, substantially as set forth.

In witness whereof I have hereunto set my hand in presence of two witnesses.

HERBERT GUTHRIE.

Witnesses:
H. B. BARLOW,
S. W. GILLETT.